United States Patent [19]

Gross

[11] Patent Number: 5,299,463
[45] Date of Patent: Apr. 5, 1994

[54] DEVICE FOR DETECTING FORCE DURING PRESSING OF CABLE SOCKETS

[75] Inventor: Herman Gross, Furth/Bayern, Fed. Rep. of Germany

[73] Assignee: AAT Aston GmbH Gerate fur Elektronikfertingung und Kabelbearbeitung, Nuremberg, Fed. Rep. of Germany

[21] Appl. No.: 776,441

[22] Filed: Oct. 18, 1991

[30] Foreign Application Priority Data

Oct. 18, 1990 [DE] Fed. Rep. of Germany ... 9014442[U]

[51] Int. Cl.$^5$ .............................................. G01L 5/00
[52] U.S. Cl. .................................. 73/862.542; 29/593; 29/753
[58] Field of Search .................. 73/818, 825, 862.542, 73/862.53; 29/707, 709, 715, 593, 862, 863, 753, 751

[56] References Cited

U.S. PATENT DOCUMENTS

| | | | |
|---|---|---|---|
| 4,823,618 | 4/1989 | Ramming | 73/862.044 |
| 4,856,186 | 8/1989 | Yeomans | 29/863 |
| 4,914,602 | 4/1990 | Abe et al. | 29/863 |
| 5,092,026 | 3/1992 | Klemmer et al. | 29/593 |
| 5,101,651 | 4/1992 | Yeomans | 29/753 |
| 5,123,165 | 6/1992 | Strong et al. | 29/705 |
| 5,168,611 | 12/1992 | Hornung | 29/753 |
| 5,168,736 | 12/1992 | Enneper et al. | 29/715 |

*Primary Examiner*—Robert Raevis
*Attorney, Agent, or Firm*—Browdy and Neimark

[57] ABSTRACT

The present apparatus makes use of an intermediate plate on which a pressing tool can be mounted. The intermediate plate has a sensor for detecting the crimping force, from which the signals can be processed and displayed via a measurement processor. The apparatus offers the advantage of continuous monitoring of the individual crimpings, in the course of which a very high degree of measuring accuracy is additionally obtained, since the sensor is disposed particularly close to the crimping pistons. With the use of an intermediate plate, it is possible to exchange the device between individual presses in a simple manner so that the device can be used as a "mobile" device. The apparatus further relates to the use of a method for detecting the force used in crimping of cable sockets. This method is characterized in that at the start, at least one calibrated curve is prepared as a function of the part to be crimped, which becomes the basis for the subsequent detection of the quality of crimping, that in the course of crimping the deviations of the respective crimping from the determined calibration curves are detected. The respective crimping is marked or removed, if the actual deviation found exceeds the previous determined set value.

15 Claims, 2 Drawing Sheets

DEVICE FOR DETECTING FORCE DURING PRESSING OF CABLE SOCKETS

FIELD OF INVENTION

The present novelty relates to a device for detecting the force, especially crimping force, during crimping of cable sockets using a mechanically, pneumatically or hydraulically-driven crimping press.

BACKGROUND OF THE INVENTION

Cables provided with cable sockets are especially employed in the automobile industry. In order to connect cables with electrical components, the insulation at the cable end is removed and the open wire strand is crimped with a cable plug, also called cable socket. Some connections between cable strands and cable sockets are often the cause of interruptions or disruptions, and these can only be found with difficulty. Ignition troubles in motor vehicles are an example, which can be caused by a lack of a connection between cable strands and cable sockets. Problems occur, for example, if a portion of the insulation has been crimped along with the cable, or when individual wires have been removed from the strand in the course of removing the insulation and crimping then takes place, or with either too high or too low a crimping pressure.

SUMMARY OF THE INVENTION

It is an object of the present invention to provide a device which assures checking of the crimping and a possibility of detection and removal of bad connections. At the same time, the device should be usable in as varied a manner as possible, i.e. independently of the type of the particular press used or it should be one which can be retrofitted on already existing presses. Finally, the device should have a particularly high degree of accuracy and assure the possibility of an integration into an automatic process.

This object is attained in accordance with the invention in that a intermediate plate is provided on which the pressing tool can be mounted and that the intermediate plate has a sensor for detecting the crimping force, the signals of which can be processed and displayed via a measurement processor. The invention offers the advantage of continuous monitoring of the individual crimpings, in the course of which a very high degree of measuring accuracy is additionally attained, since the sensor is disposed particularly close to the crimping pistons, because of which machine-relate interference effects (torsional stability of the press) can be avoided. Based on the use of an intermediate plate, it is possible to exchange the device between individual presses in a simple manner so that the device can be used as a "mobile" device. Finally, the structural simplicity of the device in accordance with the invention is surprising.

At least one wire strain gauge is usefully provided as the sensor. The deflection of the intermediate plate, caused by the force acting on the cable socket, can be determined by means of the wire strain gauge.

To attain as high as possible a degree of measuring accuracy, i.e. as wide a measuring range as possible, the wire strain gauge is located in the area of the force flux line.

In this connection the wire strain gauge is usefully disposed in such a way that the power flux line intersects the wire strain gauge centrally. By "power flux line" what is meant is that line or the extension thereof which shows the highest tensile strain in the surface area.

A considerable improvement of the measuring accuracy can be attained if the intermediate plate is surface-treated. The measuring accuracy of the wire strain gauge can be increased greatly and in many ways by this step.

Usefully, the intermediate plate is machined at least in the area of the wire strain gauge, for example by grinding and/or polishing.

In accordance with another embodiment of the present invention, a plurality of wire strain gauges is provided at different places of the intermediate plate so as to be able to perform comparison measurements or to detect additional variables such as temperature-related strain changes etc. and to further increase the measuring accuracy by this.

For the purpose of protection from mechanical effects and in particular the possibility of detecting strain forces, the wire strain gauge(s) is/are disposed on the underside of the intermediate plate, i.e. on the side facing away from the crimping tool.

In order to be able to move the intermediate plate provided with the wire strain gauge as quickly as possible between individual presses, a further useful embodiment of the device according to the present invention provides that the intermediate plate is releasably connected with the base plate of the press as well as with the lower crimping tool.

Quick installation or moving of the device in accordance with the invention can be attained by the use of clamping means as connecting means.

If the top of the intermediate plate has a stop in the shape of several claws on which the crimping tool can be placed, it is possible to mount individually shaped crimping tools without problems. The claws provide an exact alignment of the intermediate plate in respect to the crimping tool. Final clamping can subsequently take place by use of a screw connection or the like.

A further embodiment of the device in accordance with the present invention is distinguished in that the intermediate plate has a conduit which permits removal of waste generated during crimping.

An amplifier, an A/D converter, a device for electronic evaluation and/or a computer as well as a display device are provided for signal processing.

In a useful manner the device for the electronic evaluation of the signals or the computer compare a measured ACTUAL signal with a SET value range and as a function of this generate a positive or negative signal. If the measured ACTUAL signal falls outside of the SET value range, the negative signal of the computer or of the device for the electronic evaluation of the signals assures that the appropriate crimping is removed from the production process (as waste). As a result of this, the invention can be used with particular advantage in an automatic production process.

The invention assure the advantage that the crimping tool can be exchanged in the simplest manner in a crimping press, while the measuring sensor remains in a location on the press which is advantageous from the viewpoint of measuring technology. By means of this a new calibration of the sensor based on the particular press each time the crimping tool is exchanged is also avoided, which would be necessary if the sensor were crimping tool-dependent.

The instant invention further relates to a so-called crimping press for crimping of cable sockets into cable strands, where the crimping press has a mechanically, pneumatically or hydraulically-driven crimping tool as well as a base plate disposed on the lower press frame, which receives the crimping tool.

To assure checking of the crimpings which is as exact as possible, as well as the removal of bad crimpings in the course of an automated production process, the crimping press in accordance with the present invention is characterized in that a device for detecting the force used in crimping is used.

The subject of the instant invention additionally relates to a method for detecting the force used in crimping of cable sockets by using the device of the invention. This method is characterized by the invention in that at the start at least one calibrating curve is prepared as a function of the part to be crimped, which becomes the basis for the subsequent detection of the quality of crimping, that in the course of crimping the deviations of the respective crimping from the determined calibration curve are detected, instead of the absolute force values, and that the respective crimping is marked or removed, if the ACTUAL deviation found exceeds a previously determined SET value.

BRIEF DESCRIPTION OF DRAWINGS

An embodiment of the device in accordance with the novelty for detecting the force during crimping of cable sockets into cable strands will be described in detail by means of the drawings.

DETAILED DESCRIPTION OF EMBODIMENT(S)

Figure 1A:
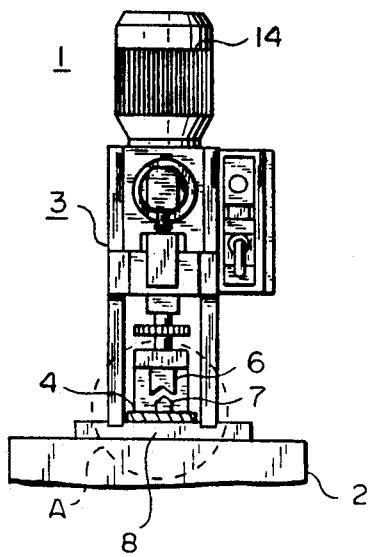
FIGS. 1A and 1B show a crimping press in a front view (a) and in a lateral view (b)
Figure 1B:
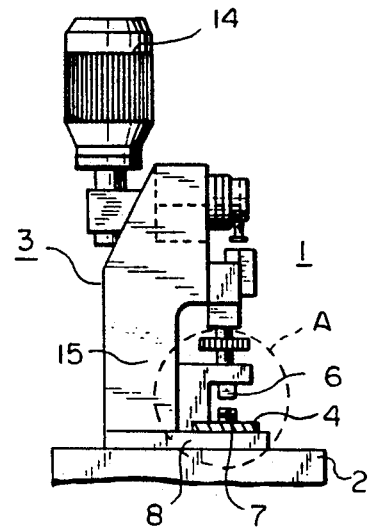

FIGS. 1A and 1B show as so-called crimping press 1 for crimping of cable sockets into cable strands. The crimping press 1 has a drive 14 in the form of an electric motor, the force of which is transferred via a suitable transmission to the upper press piston 6 of the crimping tool 3. The cable socket which is to be crimped into the cable strands is inserted between the two press pistons 6 and 7, the upper press piston 6 is subsequently moved downward and a crimping operation is performed.

The lower press piston 7 is located on the top of the so-called intermediate plate 4. The intermediate plate 4 represents the mounting plate for the crimping tool.

Figure 4:
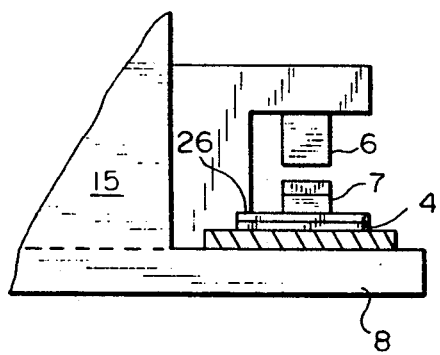
FIG. 4 is an enlarged view of the area of the crimping press in accordance with FIG. 1 designated by A.

FIG. 4 shows that the lower press piston 7 has a retaining plate 26 for a retainer which is releasably connected with the intermediate plate 4. By means of this it is possible to exchange the respective crimping tool in a simple manner without the need for changing the intermediate plate.

By "crimping tool 3" is meant the press pistons 6 and 7 as well as their retainer.

The press 1 furthermore has a press housing 15, which supports the individual machine parts.

The intermediate plate is connected rigidly, but releasably, for example via screw connections, with the base plate 8 of the press 1.

Mounting of the crimping tool on the intermediate plate takes place by means of stops (not shown) and a quick-release screw connection.

Figure 2:
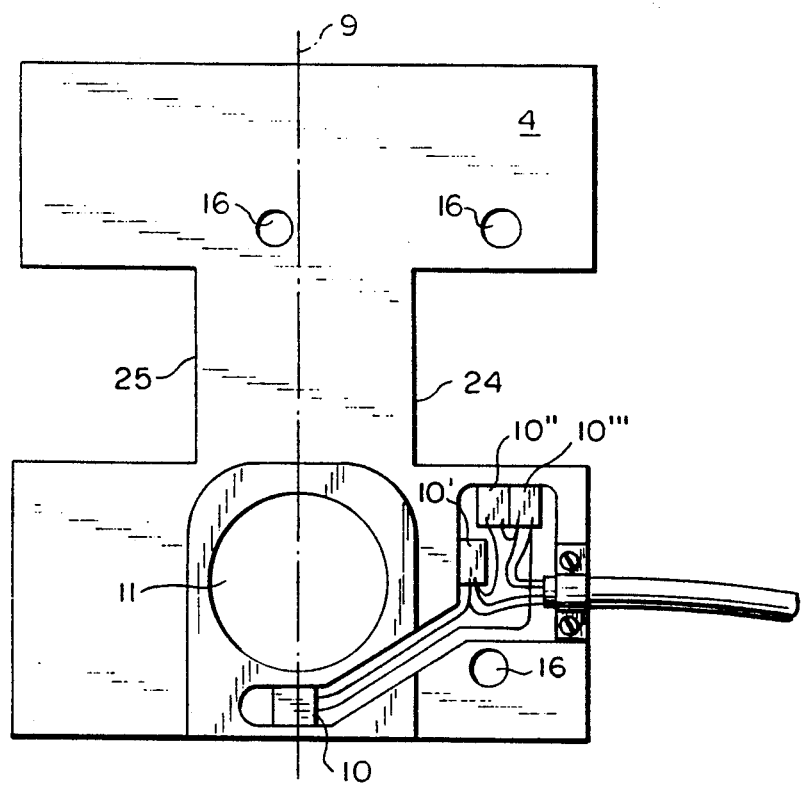
FIG. 2 shows the underside of the intermediate plate with the wire strain gauge.

In FIG. 2 the intermediate plate 4, namely its top, is shown in an enlargement. The intermediate plate 4 has a plurality of bores 16 which are used to receive the fastening bolts (not shown).

The reference numeral 9 identifies the so-called "force flux line", i.e. the line or the extension thereof, along which the strain force on the intermediate plate 4 is greatest.

A plurality of wire strain gauges 10, $10^{I\text{-}III}$ is provided on the underside of the intermediate plate 4, where the center of a wire strain gauge 10 is intersected by the force flux line. The wire strain gauge detects the tensile strain generated in the area of the force flux line during crimping. In a useful manner this wire strain gauge is disposed below the press piston 7.

It is the job of the wire strain gauge $10^I$ to detect temperature-related strain changes at the intermediate plate and in this way to perform a temperature compensation, which again makes it possible to increase the measuring accuracy. The wire strain gauges $10^{II\text{-}III}$ are only amplifier-conditioned, however, they can also be omitted.

The wire strain gauges are cross-linked among each other as well as with a measuring value receiver.

Claws (not shown) are located on the top of the intermediate plate 4, which allow simple alignment of the crimping tool 3. The claws act in the way of stops and thus fix the crimping tool. Fastening can then advantageously be accomplished by means of a screw connection or the like.

The intermediate plate 4 has two cutouts 24, 25 in the area of its sides which are provided to receive corresponding parts of the press housing 15 or of the crimping tool 3.

FIG. 2 further shows a conduit 11 on plate 4 which permits removal of waste generated during crimping.

The surface of the intermediate plate 4 is machined, i.e. ground and preferably additionally polished, because of which the measuring accuracy is considerably increased.

Figure 3:
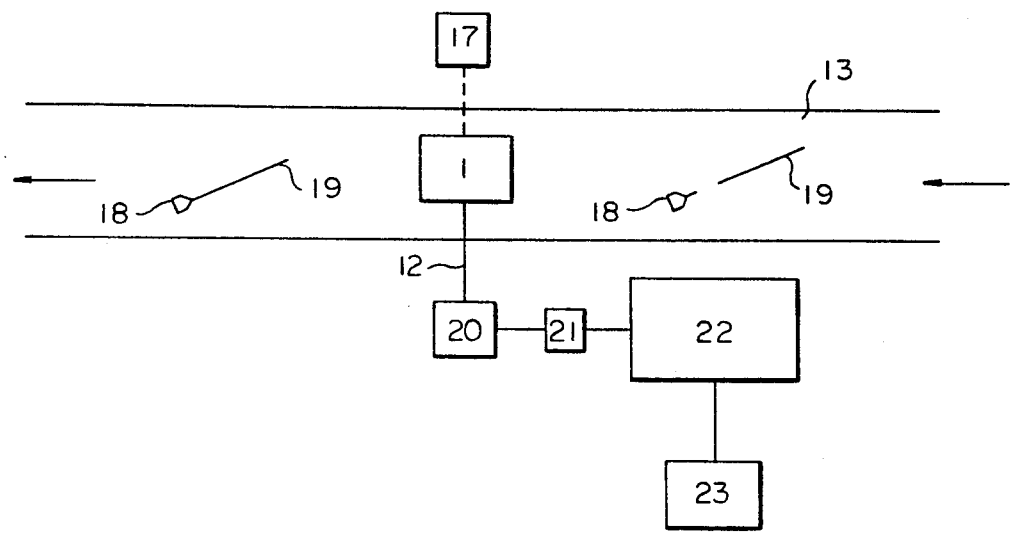
FIG. 3 is a block diagram to show the components required for processing of the measured values.

FIG. 3 shows the inclusion of the device in accordance with the novelty in an automatic production process. The reference numeral 13 indicates a conveyor belt, on which cables 19 and cable sockets 18 are transported to a crimping press.

The cables 19 and the cable sockets 18 are crimped together in the crimping press 1 in the manner described, where a signal corresponding to the crimping force is generated by means of the wire strain gauges. This signal is amplified in an amplifier 20, converted into a digital signal in an A/D converter 21 and processed in the computer 22. Display of the measured value is provided by means of the display device 23.

The computer 22 compares a measured ACTUAL signal with a SET value or a SET value range and generates a positive or a negative signal as a function of this comparison. If the measured ACTUAL signal diverges from the SET value or SET value range, the computer 22 generates a negative signal which is forwarded via a data bus 12 to the crimping press 1 and which assures with the aid of suitable devices that the respective faulty connection between the cable socket 18 and the cable strand 19 is removed from the production process as waste 17.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A device for detecting the force during crimping of cable sockets with cable strands, using a mechanically, pneumatically or hydraulically-driven crimping press, comprising:

an intermediate plate (4), on which a crimping tool (3) can be mounted, and that said intermediate plate (4) has a sensor for detecting a crimping force and producing signals, said signals of which is processed via a measuring value processor and can be displayed, and wherein said crimping tool includes a lower piston (7) fastened on a retaining plate (26), and that said intermediate plate (4) is disposed between said retaining plate (26) and a base plate (8) or a lower frame (2), whereby with an identical intermediate plate (4) and thus an identical sensor, said crimping tool can be replaced.

2. A device in accordance with claim 1, characterized in that at least one wire strain gauge is provided as said sensor or said identical sensor.

3. A device in accordance with claim 2, characterized in that said at least one wire strain gauge is located in the area of the force flux line (9) acting on said intermediate plate (4) or said identical intermediate plate.

4. A device in accordance with claim 3, characterized in that said wire strain gauge is disposed in such a way that the force flux line (9) intersects the wire strain gauge (10).

5. A device in accordance with claim 2 characterized in that a plurality of wire strain gauges (10, $10^{I-III}$) including said at least one strain gauge are provided at different locations on said intermediate plate (4) or said identical intermediate plate.

6. A device in accordance with claim 5, characterized in that the at least one of said plurality of wire strain gauges (10, $10^{I-III}$) is disposed on the underside of the intermediate plate (4) or said identical intermediate plate.

7. A device in accordance with claim 5, characterized in that said intermediate plate (4) or said identical intermediate plate is polished at least in an area of said plurality wire strain gauges ($10-10^{I-III}$).

8. A device in accordance with claim 1, characterized in that said intermediate plate (4) or said identical intermediate plate is surface-treated.

9. A device in accordance with claim 1 further comprising connecting means whereby said intermediate plate (4) or said identical intermediate plate is releasably connected to said base plate (8) of said crimping press.

10. A device in accordance with claim 9, characterized in that said connecting means comprises clamping means.

11. A device in accordance with claim 9, characterized in that a top of said intermediate plate (4) or said identical intermediate plate has claws against which the crimping tool can be placed.

12. A device in accordance with claim 1 characterized in that said intermediate plate (4) or said identical intermediate plate has a conduit (11) for removal of waste generated during crimping.

13. A device in accordance with claim 1, characterized in that an amplifier (20), and A/D converter (21), a computer or a device for the electronic evaluation of signals (22) and a display device (23) are provided for processing said signals from said sensor.

14. A device in accordance with claim 13, characterized in that the computer (22) compares a measured ACTUAL signal with a SET value or a SET value range and generates a positive or negative signal as a function of this comparison.

15. A method for detecting the force in the course of crimping of cable sockets, using the device of the invention in accordance with claim 1, characterized in that at least one calibrating curve is prepared as a function of the part to be crimped, which becomes the basis for subsequent detection of the quality of crimping, that in the course of crimping the deviations of the respective crimping from the determined calibration curve are detected, and that the respective crimping is marked or removed, if the deviation found exceeds a previously determined value.

* * * * *